United States Patent
Brown et al.

(10) Patent No.: US 10,857,619 B2
(45) Date of Patent: Dec. 8, 2020

(54) CONTROL OF INTERMETALLIC COMPOUND GROWTH IN ALUMINUM TO STEEL RESISTANCE WELDING

(71) Applicant: GM GLOBAL TECHNOLOGY OPERATIONS LLC, Detroit, MI (US)

(72) Inventors: Tyson W. Brown, Royal Oak, MI (US); David R. Sigler, Shelby Township, MI (US); Blair E. Carlson, Ann Arbor, MI (US); Amberlee S. Haselhuhn, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 759 days.

(21) Appl. No.: 15/485,996

(22) Filed: Apr. 12, 2017

(65) Prior Publication Data

US 2017/0297136 A1      Oct. 19, 2017

Related U.S. Application Data

(60) Provisional application No. 62/322,360, filed on Apr. 14, 2016, provisional application No. 62/323,256, filed on Apr. 15, 2016.

(51) Int. Cl.
*B23K 11/20* (2006.01)
*B23K 11/11* (2006.01)
(Continued)

(52) U.S. Cl.
CPC ............ *B23K 11/20* (2013.01); *B23K 11/115* (2013.01); *B23K 11/163* (2013.01);
(Continued)

(58) Field of Classification Search
CPC ..... B23K 11/185; B23K 11/20; B23K 11/163; B23K 11/166
See application file for complete search history.

(56) References Cited

U.S. PATENT DOCUMENTS

| | | |
|---|---|---|
| 5,302,797 A | 4/1994 | Yasuyama et al. |
| 5,304,769 A | 4/1994 | Ikegami et al. |

(Continued)

FOREIGN PATENT DOCUMENTS

| | | |
|---|---|---|
| CN | 1946506 | 4/2007 |
| CN | 102059439 | 5/2011 |

(Continued)

OTHER PUBLICATIONS

English translation of CN 102059439 to Mazda Motor (published May 18, 2011).

(Continued)

*Primary Examiner* — Geoffrey S Evans
(74) *Attorney, Agent, or Firm* — Reising Ethington P.C.

(57) ABSTRACT

A method of resistance spot welding a workpiece stack-up that includes an aluminum workpiece and an overlapping adjacent steel workpiece so as to minimize the thickness of an intermetallic layer comprising Fe—Al intermetallic compounds involves providing reaction-slowing elements at the faying interface of the aluminum and steel workpieces. The reaction-slowing elements may include at least one of carbon, copper, silicon, nickel, manganese, cobalt, or chromium. Various ways are available for making the one or more reaction-slowing elements available at the faying interface of the aluminum and steel workpieces including being dissolved in a high strength steel or being present in an interlayer that may take on a variety of forms including a rigid shim, a flexible foil, a deposited layer adhered to and metallurgically bonded with a faying surface of the steel workpiece, or an interadjacent organic material layer that includes particles containing the reaction-slowing elements.

11 Claims, 6 Drawing Sheets

(51) Int. Cl.
   *B23K 11/16*   (2006.01)
   *B23K 11/18*   (2006.01)
   *B23K 35/00*   (2006.01)
   *B23K 35/02*   (2006.01)
   *B23K 35/30*   (2006.01)
   *B23K 35/36*   (2006.01)
   *C22C 38/02*   (2006.01)
   *C22C 38/04*   (2006.01)
   *C22C 38/16*   (2006.01)
   *B23K 103/04*   (2006.01)
   *B23K 103/10*   (2006.01)
   *B23K 103/20*   (2006.01)
   *B23K 101/00*   (2006.01)
   *B23K 101/34*   (2006.01)
   *B23K 101/18*   (2006.01)

(52) U.S. Cl.
   CPC .......... *B23K 11/185* (2013.01); *B23K 35/002* (2013.01); *B23K 35/004* (2013.01); *B23K 35/0294* (2013.01); *B23K 35/3053* (2013.01); *B23K 35/3612* (2013.01); *C22C 38/02* (2013.01); *C22C 38/04* (2013.01); *C22C 38/16* (2013.01); *B23K 2101/006* (2018.08); *B23K 2101/18* (2018.08); *B23K 2101/34* (2018.08); *B23K 2101/35* (2018.08); *B23K 2103/04* (2018.08); *B23K 2103/10* (2018.08); *B23K 2103/20* (2018.08)

(56) References Cited

U.S. PATENT DOCUMENTS

| | | | |
|---|---|---|---|
| 5,783,794 | A | 7/1998 | Oikawa et al. |
| 6,037,559 | A | 3/2000 | Okabe et al. |
| 7,850,059 | B2 | 12/2010 | Kobayashi et al. |
| 7,935,908 | B2 | 5/2011 | Nakagawa et al. |
| 7,951,465 | B2 | 5/2011 | Urushihara et al. |
| 7,984,840 | B2 | 7/2011 | Kobayashi et al. |
| 8,020,749 | B2 | 9/2011 | Kobayashi et al. |
| 8,058,584 | B2 | 11/2011 | Miyamoto et al. |
| 8,487,206 | B2 | 7/2013 | Urushihara et al. |
| 8,502,105 | B2 | 8/2013 | Tanaka et al. |
| 9,676,065 | B2 | 6/2017 | Sigler et al. |
| 2005/0218121 | A1* | 10/2005 | Hayashi ................ B32B 15/012 219/118 |
| 2005/0247679 | A1 | 11/2005 | Wang |
| 2007/0212565 | A1 | 9/2007 | Urushihara et al. |
| 2009/0255908 | A1 | 10/2009 | Sigler et al. |
| 2011/0097594 | A1 | 4/2011 | Tanaka et al. |
| 2012/0021240 | A1* | 1/2012 | Urushihara ........ B23K 11/3009 428/594 |
| 2013/0168366 | A1* | 7/2013 | Kinefuchi ............... B23K 11/34 219/91.2 |
| 2013/0189023 | A1 | 7/2013 | Spinella |
| 2013/0263638 | A1 | 10/2013 | Gugel et al. |
| 2014/0305912 | A1 | 10/2014 | Taniguchi et al. |
| 2014/0360986 | A1 | 12/2014 | Sigler et al. |
| 2015/0053654 | A1 | 2/2015 | Sigler et al. |
| 2015/0053655 | A1 | 2/2015 | Sigler et al. |
| 2015/0083693 | A1 | 3/2015 | Schroth et al. |
| 2015/0096961 | A1 | 4/2015 | Carlson et al. |
| 2015/0096962 | A1 | 4/2015 | Sigler et al. |
| 2015/0231729 | A1 | 8/2015 | Yang et al. |
| 2015/0231730 | A1 | 8/2015 | Sigler et al. |
| 2015/0352658 | A1 | 12/2015 | Yang et al. |
| 2015/0352659 | A1 | 12/2015 | Sigler et al. |
| 2016/0016252 | A1 | 1/2016 | Edwards, II |
| 2016/0158874 | A1 | 6/2016 | Wang et al. |
| 2016/0279732 | A1 | 9/2016 | Sigler et al. |
| 2016/0288242 | A1 | 10/2016 | Sigler et al. |
| 2016/0346865 | A1 | 12/2016 | Sigler et al. |
| 2017/0008118 | A1 | 1/2017 | Yang et al. |
| 2017/0106466 | A1 | 4/2017 | Sigler et al. |
| 2017/0157697 | A1* | 6/2017 | Yang ..................... B23K 11/115 |
| 2017/0225262 | A1 | 8/2017 | Sigler et al. |
| 2017/0225263 | A1 | 8/2017 | Sigler et al. |
| 2017/0232548 | A1 | 8/2017 | Carlson et al. |
| 2017/0252853 | A1 | 9/2017 | Wang et al. |
| 2017/0282303 | A1 | 10/2017 | Wang et al. |
| 2017/0291246 | A1 | 10/2017 | Sigler et al. |
| 2017/0291247 | A1 | 10/2017 | Sigler et al. |
| 2017/0291248 | A1 | 10/2017 | Sigler et al. |
| 2017/0297134 | A1 | 10/2017 | Sigler et al. |
| 2017/0297135 | A1 | 10/2017 | Sigler et al. |
| 2017/0297137 | A1 | 10/2017 | Perry et al. |
| 2017/0297138 | A1 | 10/2017 | Sigler et al. |
| 2017/0304925 | A1 | 10/2017 | Sigler et al. |
| 2017/0361392 | A1 | 12/2017 | Sigler et al. |

FOREIGN PATENT DOCUMENTS

| | | |
|---|---|---|
| CN | 102114574 | 7/2011 |
| CN | 103108714 A | 5/2013 |
| CN | 103231203 A | 8/2013 |
| JP | 11342477 | 12/1999 |
| JP | 2011224578 | 11/2011 |
| JP | 2013151017 | 8/2013 |

OTHER PUBLICATIONS

English translation JP 2011224578 to Kobe Steel (published Nov. 10, 2011).

English translation of JP2013151017 to Mazda Motor (published Aug. 8, 2013).

Haselhuhn et al., U.S. Appl. No. 15/807,219 entitled "Electrode Weld Face Design," filed Nov. 8, 2017.

Sigler et al., U.S. Appl. No. 15/907,996 entitled "Improving Mechanical Performance of Al-Steel Weld Joints by Limiting Steel Sheet Deformation," filed Feb. 28, 2018.

Sigler et al., U.S. Appl. No. 15/920,784 entitled "Resistance Spot Welding Workpiece Stack-Ups Having a Steel Workpiece and an Aluminum Workpiece with a Steel Plate," filed Mar. 14, 2018.

Sigler et al., U.S. Appl. No. 15/976,163 entitled "Multi-Step Direct Welding of an Aluminum-Based Workpiece to a Steel Workpiece," filed May 10, 2018.

Yang et al., U.S. Appl. No. 15/992,748 entitled "Electrode for Resistance Spot Welding of Dissimilar Metals," filed May 30, 2018.

Wang et al., "Interface microstructure and weld strength of steel/aluminum alloy joints by resistance spot welding," Applied Mechanics and Materials, vols. 117-119 (2012) pp. 1895-1899.

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (Jun. 2011) No. 2 pp. 1-6.

Weihua et al., "Interfacial characterization of resistance spot welded joint of steel and aluminum alloy," China Welding, vol. 19 (Dec. 2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (Feb. 1979) No. 1 pp. 10-17.

(56) References Cited

OTHER PUBLICATIONS

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (Apr. 2011) No. 5 pp. 967-973.

\* cited by examiner

CONTROL OF INTERMETALLIC COMPOUND GROWTH IN ALUMINUM TO STEEL RESISTANCE WELDING

CROSS-REFERENCE TO RELATED APPLICATION(S)

This application claims the benefit of U.S. Provisional Application Nos. 62/322,360 filed on Apr. 14, 2016 and 62/323,256 filed on Apr. 15, 2016. The entire contents of each the aforementioned provisional applications are incorporated herein by reference.

TECHNICAL FIELD

This disclosure pertains generally to resistance spot welding of an aluminum workpiece to a steel workpiece and, more specifically, to spot welding practices in which elements that slow the growth of aluminum- and iron-containing intermetallic compounds are introduced at the faying interface of the aluminum and steel workpieces to thereby increase the ductility and energy absorption of a weld joint formed between the aluminum and steel workpieces by way of resistance spot welding.

INTRODUCTION

There is continuing interest in reducing the mass of vehicles. This goal, coupled with the need to maintain strength and stiffness, has led to the adoption of higher strength-to-weight workpiece materials in vehicle bodies. In many instances, different material families, such as high-strength steels, aluminum alloys, and magnesium alloys may be used in combination in a single vehicle body. It will be appreciated that in all steels, iron is the primary constituent. In the steels used in vehicle bodies, iron is typically present in concentrations of greater than 95 wt %. Generally, carbon contents are maintained below about 0.30 wt % while other elements, such as manganese and silicon, may typically be present individually in concentrations of up to 1.5 wt % and collectively in concentrations of up to about 3 wt %. Residual or impurity elements are maintained at the lowest practicable concentration, and are generally limited to no more than 0.35 wt % for individual elements and no more than 0.5 wt % in aggregate.

Aluminum alloys are composed of at least 85 wt % aluminum and may contain a variety of alloying elements including copper, magnesium, and silicon, individually or in combination. The particular alloying elements may be identified by a numbering scheme developed by the Aluminum Association, which designates aluminum alloys by a four-digit code preceded by the prefix AA (for Aluminum Association). The first digit of the four-digit code designates the primary alloying elements with subsequent digits indicating relative concentrations. In many automotive applications, AA6xxx alloys containing magnesium and silicon in varying proportions are preferred, but the issues of welding aluminum workpieces to steel workpieces, as described below, are applicable to all aluminum alloy series materials.

The strength and stiffness of a vehicle body generally results from the cooperative interaction between a plurality of mutually-attached, individually-stamped or otherwise shaped metal components, which are generically termed "workpieces," each generally less than 3 millimeters thick and, more commonly, ranging from 0.65 millimeters to 2.5 millimeters thick. Historically, the preferred method of attaching steel workpieces to one another is has involved the use resistance spot welding. Resistance spot welding is a process in which a high current electrical flow is briefly passed through two or more workpieces assembled in an overlapping configuration. In the context of steel-to-steel applications, which have been broadly developed over decades of use in manufacturing settings, the resistance heating resulting from the passage of electrical current is sufficient to form a pool of molten steel that consumes the interface(s) between abutting workpieces. On cooling, the molten weld pool solidifies to fusion weld the overlapping workpieces together through a common weld nugget having a steel contribution from each of the overlapping steel workpieces. This shared weld nugget strongly secures the steel workpieces together.

While resistance spot welding has long been used to join low carbon, low strength steel workpieces to each other, and to some extent aluminum workpieces to each other, the use of resistance spot welding to joint together workpieces of dissimilar material families has seen much less success. To be sure, when seeking to join an aluminum workpiece to a steel workpiece, and, more particularly, a high performance aluminum alloy to a high-strength steel that exhibits tensile strength of 300 MPa and greater, and more preferably 500 MPa or greater, a weld nugget that fusion welds the two workpieces together is not attainable; rather, a weld joint is formed entirely within the aluminum workpiece that is bonded or brazed to the steel workpiece, which is a much different structure with much different characteristics than a traditional fusion weld nugget. Additionally, the ability to cultivate a strong weld joint between an aluminum workpiece and a steel workpiece is complicated by several factors (1) the presence of a mechanically tough and electrically insulating surface oxide layer on the aluminum workpiece, (2) the several hundred degree difference in the melting points of the aluminum and steel workpieces (steel alloys melt at ~1500° C., aluminum alloys melt at ~600° C.), (3) the significantly larger thermal and electrical conductivities of the aluminum workpiece compared to the steel workpiece, and (4) the propensity for aluminum and steel to react together to form hard and brittle iron-aluminum intermetallic compounds at the interface of the weld joint and the steel workpiece.

SUMMARY

An embodiment of a method of resistance spot welding a workpiece stack-up that includes an aluminum workpiece and an adjacent overlapping steel workpiece so as to minimize the thickness of an intermetallic layer comprising Fe—Al intermetallic compounds may include several steps. In one step, a workpiece stack-up is provided that has an accessible first side and an opposed accessible second side. The workpiece stack-up comprises an aluminum workpiece and an overlapping adjacent steel workpiece and further comprises one or more reaction-slowing elements at a faying interface established between the aluminum and steel workpieces. The reaction-slowing elements may comprise at least one of carbon, copper, silicon, nickel, manganese, cobalt, or chromium. In another step, a weld face of a first welding electrode is pressed against the first side of the workpiece stack-up and a weld face of a second welding electrode is pressed against the second side of the workpiece stack-up in facial alignment with the weld face of the first welding electrode. In yet another step, an electrical current is passed between the weld faces of the first and second welding electrodes and through the workpiece stack-up. The passage of the electrical current melts the aluminum workpiece and creates a molten weld pool contained within the aluminum workpiece. The one or more reaction-slowing elements suppress the formation and growth of Fe—Al intermetallic compounds. In still another step, the passage of electrical current is terminated to allow the molten weld pool to solidify into a weld joint that includes an aluminum weld nugget within the aluminum workpiece and one or more Fe—Al intermetallic layers at a bonding surface of the weld joint.

The method of the aforementioned embodiment may be further defined. For example, the steel workpiece in the workpiece stack-up may be a high strength steel and the one or more reaction-slowing elements may be dissolved therein as alloying elements of the high strength steel. The high strength steel in such an implementation may include carbon in an amount of 0.010 wt % or greater, manganese in an amount of 0.5 wt % or greater, silicon in an amount of 0.030 wt % or greater, and/or copper in an amount of 0.35 wt % or less. In another example, an interlayer disposed between a faying surface of the aluminum workpiece and a faying surface of the steel workpiece may include the reaction-slowing elements. Such an interlayer may be a rigid shim. In particular, the rigid shim may be composed of high strength steel in which the one or more reaction-slowing elements are alloying elements of the high strength steel, or the rigid shim may be composed of a custom ferrous-based alloy that includes the one or more reaction-slowing elements dissolved in a solid solution. If the rigid shim is composed of the custom ferrous-based alloy, the custom ferrous-based alloy may be an alloy of (1) iron and carbon with at least 0.010 wt % carbon, (2) iron and copper with at least 0.2 wt % copper, (3) iron and silicon with at least 0.030 wt % silicon, or (4) iron and manganese with at least 0.5 wt % manganese.

The interlayer may also be in the form of a flexible foil composed of a custom ferrous-based alloy that includes the one or more reaction-slowing elements dissolved in a solid solution. Under these circumstances, the custom ferrous-based alloy may be an alloy of (1) iron and carbon with at least 0.010 wt % carbon, (2) iron and copper with at least 0.2 wt % copper, (3) iron and silicon with at least 0.030 wt % silicon, or (4) iron and manganese with at least 0.5 wt % manganese. Still further, the interlayer may be a deposited layer adhered directly to and metallurgically bonded with the faying surface of the steel workpiece. Additionally, the interlayer may be an interadjacent organic material layer that includes an organic material matrix and particles containing one or more of the reaction-slowing elements dispersed throughout and embedded within the polymer matrix.

DETAILED DESCRIPTION

The present disclosure relates to methods of minimizing the growth rate of iron-aluminum intermetallic compounds when resistance spot welding together an aluminum workpiece and a steel workpiece. Reducing the growth rate of these intermetallic compounds reduces the thickness of the intermetallic layer in the weld joint and results in a weld joint with improved ductility and energy absorption. For instance, in accordance with practices of the present disclosure, the growth rate of Fe—Al intermetallic compounds may be effectively suppressed so that the intermetallic layer that develops within the weld joint adjacent to the steel workpiece has a thickness of 3 μm or less, and in many instances 1 μm or less, particularly at the perimeter of the weld joint where stresses from applied loads are greatest. The strength of the weld joint in both peel and cross-tension is also enhanced by minimizing the thickness of the intermetallic layer at the perimeter of the weld joint to such an extent. As will be described in more detail below, the present disclosure involves making certain elements that slow the growth of Fe—Al intermetallic compounds available at the faying interface of overlapping and adjacent aluminum and steel workpieces regardless of whether other additional aluminum and/or steel workpieces are also present.

Figure 1:
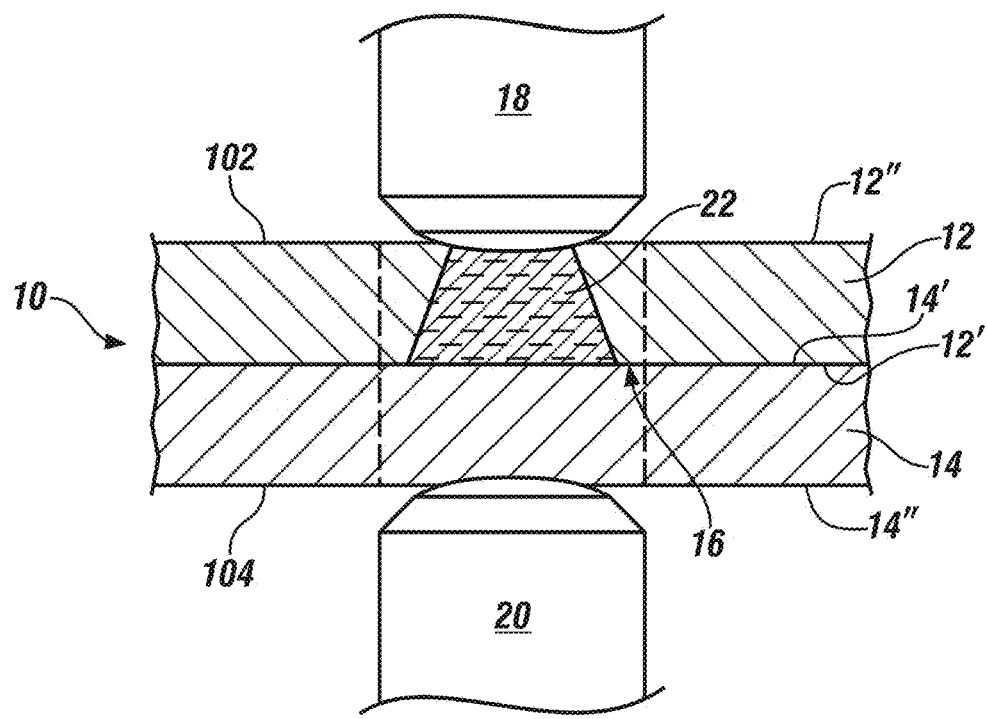
FIG. 1 is a general cross-sectional view of a workpiece stack-up, which includes an aluminum workpiece and an adjacent steel workpiece assembled in overlapping fashion, situated between a set of opposed welding electrodes during passage of electrical current between the welding electrodes and through the stack-up, wherein the passage of electrical current has caused melting of the aluminum workpiece that lies adjacent to the steel workpiece and the creation of a molten weld pool within the aluminum workpiece.
Figure 2:
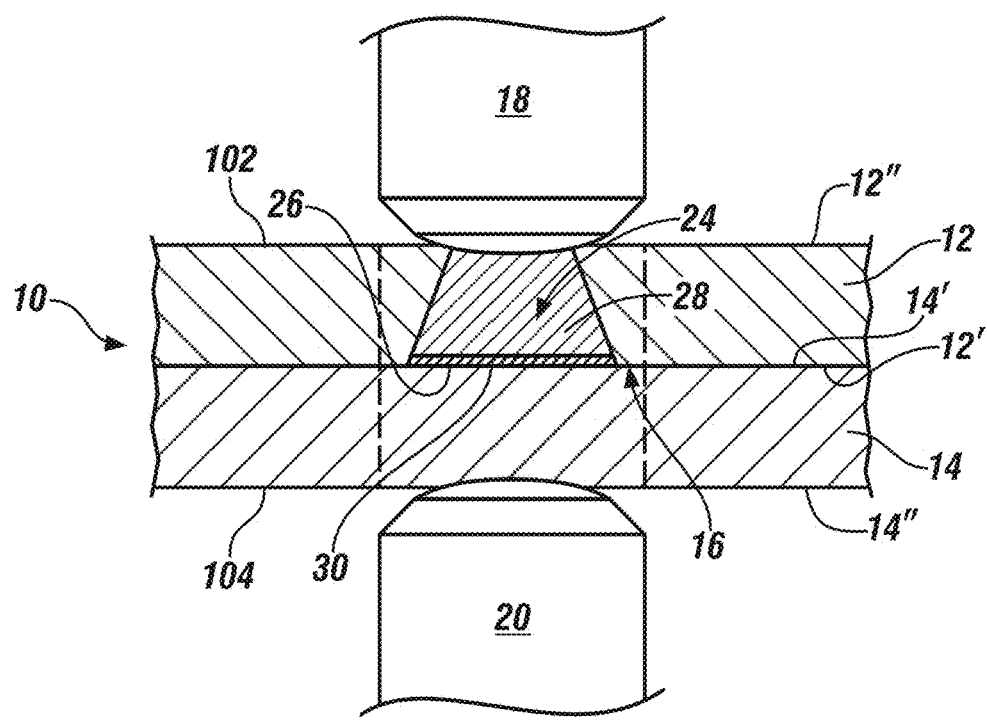
FIG. 2 is a general cross-sectional view of the workpiece stack-up and welding electrodes shown in FIG. 1 after passage of the electrical current between the welding electrodes and through the stack-up has ceased so as to allow the molten weld pool to solidify into a weld joint.

FIGS. 1-2 generally depict the practice of resistance spot welding in the context of the present disclosure. Referring now to FIG. 1, a general representative illustration of a workpiece stack-up 10 is depicted that includes a portion of an aluminum workpiece 12 and a portion of an overlapping steel workpiece 14. A faying surface 12' of the aluminum workpiece 12 and a faying surface 14' of the steel workpiece 14 confront and contact one another either directly contact or indirectly contact through an intervening material layer such as, for example, and adhesive layer (not shown in FIGS. 1-2) to establish a faying interface 16. The aluminum workpiece 12 and the steel workpiece 14 also include back surfaces 12", 14" that face away from each other. The illustrated portions of the workpieces 12, 14 may, for example, be at the periphery of the stack-up assembly 10 where a series of weld joints are intended to be formed in spaced-apart alignment along the peripheral edges. Each of the workpieces 12, 14 may have been previously shaped.

When the workpiece stack-up 10 is assembled for welding, the stack-up 10 includes an accessible first side 102 proximate the aluminum workpiece 12 and an accessible second side 104 proximate the steel workpiece 14. The term "proximate" as used herein means the actual back surface 12", 14" of the aluminum or steel workpieces 12, 14 or the surface of a neighboring workpiece of the same base metal composition. For instance, when only the aluminum and steel workpieces 12, 14 are present in the stack-up 10 (e.g., a "2T" stack-up), as shown here, the back surface 12" of the aluminum workpiece 12 provides the first side 102 and the back surface 14" of the steel workpiece 14 provides the second side 104. In other embodiments, however, an additional workpiece may be disposed on either or both sides of the adjacent steel and aluminum workpieces 12, 14 so long as the additional workpieces is of the same base metal type as its immediate neighboring aluminum or steel workpiece 12, 14. For example, the workpiece stack-up assembly 10 may include an additional aluminum workpiece disposed adjacent to and covering the back surface 12" of the aluminum workpiece 12 that lies adjacent to the steel workpiece 14, and/or it may include an additional steel workpiece disposed adjacent to and covering the back surface 14" of the steel workpiece 14 that lies adjacent to the aluminum workpiece 12. When another additional workpiece is present, the first and/or second sides 102, 104 of the stack-up assembly 10 may be provided by an additional workpiece.

The aluminum workpiece 12 includes an aluminum substrate that is either coated or uncoated. The aluminum substrate may be composed of unalloyed aluminum or an aluminum alloy that includes at least 85 wt % aluminum. Some notable aluminum alloys that may constitute the coated or uncoated aluminum substrate are an aluminum-magnesium alloy, an aluminum-silicon alloy, an aluminum-magnesium-silicon alloy, and an aluminum-zinc alloy. If coated, the aluminum substrate may include a surface layer of a refractory oxide material comprised of aluminum oxide compounds and possibly other oxide compounds as well, such as magnesium oxide compounds if, for example, the aluminum substrate is an aluminum-magnesium alloy. Such a refractory oxide material may be a native oxide coating that forms naturally when the aluminum substrate is exposed to air and/or an oxide layer created during exposure of the aluminum substrate to elevated temperatures during manufacture, e.g., a mill scale. The aluminum substrate may also be coated with a layer of zinc, tin, or a metal oxide conversion coating comprised of oxides of titanium, zirconium, chromium, or silicon, as described in U.S. Pat. Pub. No. 2014/0360986. The surface layer may have a thickness ranging from 1 nm to 10 μm and may be present on each side of the aluminum substrate. Taking into account the thickness of the aluminum substrate and any optional surface layer that may be present, the aluminum workpiece 12 has a thickness that ranges from 0.3 mm to about 6.0 mm, or more narrowly from 0.5 mm to 3.0 mm.

The aluminum substrate of the aluminum workpiece 12 may be provided in wrought or cast form. For example, the aluminum substrate may be composed of a 4xxx, 5xxx, 6xxx, or 7xxx series wrought aluminum alloy sheet layer, extrusion, forging, or other worked article. Alternatively, the aluminum substrate may be composed of a 4xx.x, 5xx.x, 6xx.x, or 7xx.x series aluminum alloy casting. Some more specific kinds of aluminum alloys that may constitute the aluminum substrate include, but are not limited to, AA5754 and AA5182 aluminum-magnesium alloy, AA6111 and AA6022 aluminum-magnesium-silicon alloy, AA7003 and AA7055 aluminum-zinc alloy, and Al-10Si—Mg aluminum die casting alloy. The aluminum substrate may further be employed in a variety of tempers including annealed (O), strain hardened (H), and solution heat treated (T), if desired. The term "aluminum workpiece" as used herein thus encompasses unalloyed aluminum and a wide variety of aluminum alloys, whether coated or uncoated, in different spot-weldable forms including wrought sheet layers, extrusions, forgings, etc., as well as castings.

The steel workpiece 14 includes a steel substrate from any of a wide variety of strengths and grades that is either coated or uncoated. The steel substrate may be hot-rolled or cold-rolled and may be composed of steel such as mild steel, interstitial-free steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when the steel workpiece 14 includes press-hardened steel (PHS). Preferred compositions of the steel substrate, however, include mild steel, dual phase steel, and boron steel used in the manufacture of press-hardened steel. Those three types of steel have ultimate tensile strengths that, respectively, range from 150 MPa to 500 MPa, from 500 MPa to 1100 MPa, and from 1200 MPa to 1800 MPa.

The steel workpiece 14 may include a surface layer on one side or both sides of the steel substrate. If a surface layer is present, the steel substrate preferably includes a surface layer of zinc (galvanized), a zinc-iron alloy (galvanneal), a zinc-nickel alloy, nickel, aluminum, an aluminum-magnesium alloy, an aluminum-zinc alloy, or an aluminum-silicon alloy, any of which may have a thickness of up to 50 μm and may be present on each side of the steel substrate. Taking into account the thickness of the steel substrate and any surface layer that may be present, the steel workpiece 14 has a thickness that ranges from 0.3 mm and 6.0 mm, or more narrowly from 0.6 mm to 2.5 mm. The term "steel workpiece" as used herein thus encompasses a wide variety of steel substrates, whether coated or uncoated, of different grades and strengths.

In the practice of resistance spot welding, two opposing welding electrodes 18, 20, typically of a copper-based composition, are pressed in facial alignment against the first and second sides 102, 104 of the workpiece stack-up 10. Each of the directly opposing welding electrodes 18, 20 has a weld face that experiences pressed engagement with its respective accessible side 102, 104 of the workpiece stack-up 10 and is designed to pass an electrical current through the workpieces 12, 14. The heat generated initiates melting in the aluminum workpiece 12 and, consequently, a molten weld pool 22 begins to form that wets the adjacent faying surface 14' of the steel workpiece 14. The molten weld pool 22 continues to grow entirely within the aluminum workpiece 12 as current continues to flow. The steel workpiece 14 does not contribute to the molten weld pool 22.

After the molten weld pool 22 has achieved a predetermined size, usually after current has flowed for 2 seconds or less, passage of the electrical current between the weld faces of the opposed welding electrodes 18, 20 is terminated. The opposing welding electrodes 18, 20 remain pressed against their respective sides 102, 104 of the workpiece stack-up 10 and the workpieces 12, 14 cool in the ambient environment. On cooling, the molten weld pool 22 solidifies in the aluminum workpiece 12 to form a weld joint 24 that has a bonding surface 26 that weld bonds or brazes the aluminum workpiece 12 to its immediately adjacent surface which, here, happens to be the faying surface 14' of the steel workpiece 14, as shown in FIG. 2. The weld joint 24 is comprised primarily of a weld nugget 28 comprised of resolidified aluminum material. The aluminum weld nugget 28 tapers in shape as it extends away from the bonding surface 26 of the weld joint 24 and may fully or partially penetrate through the thickness of the aluminum workpiece 12.

During the period that the aluminum-rich molten weld pool 22 is in existence and in contact with the faying surface 14' of the steel workpiece 14, iron from the steel workpiece 14 is extracted into the molten weld pool 22 and may, over time, comprise up to 1 wt % or so of the molten weld pool 22. At the elevated temperatures of the molten weld pool 22, which is at or above the melting point of aluminum, the dissolved iron and aluminum react to form several types of Fe—Al intermetallic compounds. Initially, for example, $FeAl_3$ compounds are believed to form on the immediately adjacent surface, which here is the faying surface 14' of the steel workpiece, that is wetted by the molten weld pool 22 followed by the formation of $Fe_2Al_5$ compounds. Of course, other types of Fe—Al intermetallic compounds may also form as a result of the reaction between aluminum and iron in the molten weld pool 22. As a result of such reactions within the molten weld pool 22, and as shown in FIG. 2, the final weld joint 24 produced by resistance spot welding typically has one or more Fe—Al intermetallic layers 30 that extend across the bonding surface 26 of the weld joint 24 and the faying surface 14' of the steel workpiece 14.

In common with most intermetallic compounds, Fe—Al intermetallic compounds such as $FeAl_3$ and $Fe_2Al_5$ are brittle and prone to fracture abruptly when deformed. The brittle character of Fe—Al intermetallic compounds, and their location at the bonding surface 26 of the weld joint 24 may diminish the ductility of the weld joint 24. This diminished ductility may, in turn, diminish the energy absorbed by the weld joint 24 during severe and abrupt deformation, such as that which may occur during a collision, thus requiring a high number of weld joints to be produced in a given vehicle component in order for the vehicle to meet collision standards. Generally, the reduction in weld joint energy absorption attributed to the Fe—Al intermetallic layer(s) 30 increases with increasing overall thickness of the intermetallic layer(s) 30. For example, when spot welding a 1.2 millimeter thick aluminum workpiece comprised of AA6022 aluminum alloy to a 2.0 millimeter thick steel workpiece comprised of hot dip galvanized low carbon steel, a weld joint with a generally constant Fe—Al intermetallic layer thickness of approximately 3 µm at the center of the weld joint will absorb nearly 50% more energy than a weld joint with a variable Fe—Al intermetallic layer thickness ranging from 3 µm to 6.5 µm at the center of the weld joint even though the latter weld joint may have a larger diameter.

Although the major constituents of aluminum and steel workpieces 12, 14—that is, aluminum and iron, respectively—may react to form the Fe—Al intermetallic compounds, as described above, the nature and extent of the reaction may be influenced by the presence of additional elements. It has been found, for instance, that some elements may slow the reaction of iron with aluminum in the aluminum-rich molten weld pool 22 and ultimately reduce the thickness of the Fe—Al intermetallic layer(s) 30 formed adjacent to the faying interface 14' of the steel workpiece 14 within the weld joint 24. As is evident from the above example, such a reduction in the thickness of the Fe—Al intermetallic compound may enhance the ductility and energy absorption of the resulting weld joint 24. Some exemplary reaction-slowing elements, generally in order of decreasing effectiveness, include carbon, copper, silicon, nickel, manganese, cobalt, and chromium. These reaction-slowing elements may be provided separately or in combination at the faying interface 16 of the aluminum and steel workpieces 12, 14 to permit their exposure to the molten aluminum weld pool 22 during current flow so as to inhibit the formation of Fe—Al intermetallic compounds. In certain practices of the present disclosure, carbon, manganese, silicon, or copper are preferred reaction-slowing elements that may be used individually or together.

Figure 3:
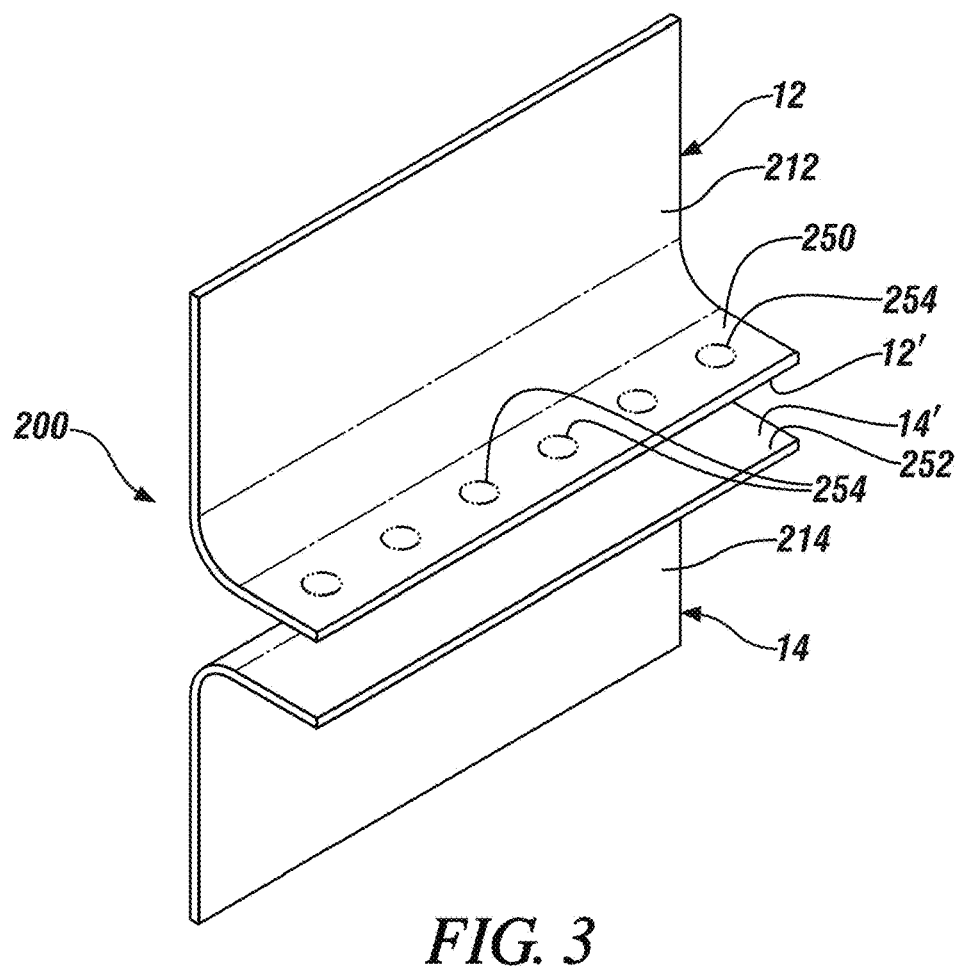
FIG. 3 shows, in perspective view, an exemplary resistance spot weld configuration for joining an aluminum workpiece to a steel workpiece according to an embodiment of the present disclosure.

FIG. 3 illustrates one embodiment of the present disclosure and involves providing the steel workpiece 14 with the reaction-slowing elements dissolved therein. Here, as shown, this embodiment is demonstrated using a weld configuration 200 that includes an aluminum workpiece 12 in the form of a sheet 212 having a flange 250 and a steel workpiece 14 in the form of a sheet 214 having a flange 252. The flanges 250, 252 of the workpieces 12, 14 may be brought together and then resistance spot welded to form weld joints 24 at each of several weld locations 254 spaced apart along the assembled and overlapping flanges 250, 252. This particular weld configuration 200 may be suited, for example, to secure a steel reinforcement to the inner panel of a vehicle closure (hood, door, liftgate), to secure a steel inner panel to an aluminum outer panel around the door opening of a vehicle, or to secure an aluminum vehicle roof to the steel lower portion of a vehicle body. The aluminum workpiece 12 may be an AA6xxx series aluminum alloy and the steel workpiece 14 may be a high strength steel that includes within its composition one or more reaction-slowing elements dissolved in a solid solution.

The steel workpiece 14 may be modified or selected to include an effective amount of dissolved reaction-slowing elements. To be sure, carbon may be found in certain steels and, when present in an amount of 0.010 wt % or greater, has been found to suppress Fe—Al intermetallic compound formation and growth. Likewise, manganese may be found in certain steels and, when present in an amount of 0.5 wt % or greater, has been found to suppress Fe—Al intermetallic compound formation and growth. Silicon may also be found in certain steels and has been shown to suppress Fe—Al intermetallic compound formation and growth when present in an amount of 0.030 wt % or greater. Copper is another element that may be found in certain steels although it is less commonly used and is generally limited to a quantity of 0.35 wt % or less in order to prevent hot shortness. Nonetheless, even in these relatively low amounts, copper has shown an ability to suppress Fe—Al intermetallic formation and growth. Certain combinations of reaction-slowing elements may also have noticeable effects at relatively low levels such as, for example, 0.2 wt % manganese combined with 0.035 wt % silicon. The composition of the steel workpiece 14 may therefore be chosen or tailored to help limit Fe—Al intermetallic compound formation and growth during spot welding.

The steel workpiece 14 employed in this embodiment of the present disclosure may be a certain steel composition whose beneficial effects on Fe—Al intermetallic compound formation and growth have previously not been appreciated. For instance, high strength steels (tensile strength of 300 MPa or greater) typically contain appreciably greater concentrations of alloying elements than lower strength, low carbon steels. And because of their effectiveness in enhancing strength, and for reasons of economy, high strength steels tend to include the more effective reaction-slowing elements of carbon, manganese, and silicon. In that regard, a particular set of high strength steels may be selected to both satisfy the requirement of high structural strength and to limit the overall thickness of the Fe—Al intermetallic layer(s) 30 to 3 μm or less across the bonding surface 26 and especially at the perimeter of the weld joint 24. Typically, these requirements may be met by steels that include carbon in an amount of 0.010 wt % or greater, manganese in an amount of 0.5 wt % or greater, silicon in an amount of 0.030 wt % or greater, and/or copper in an amount of 0.35 wt % or less.

Figure 4:
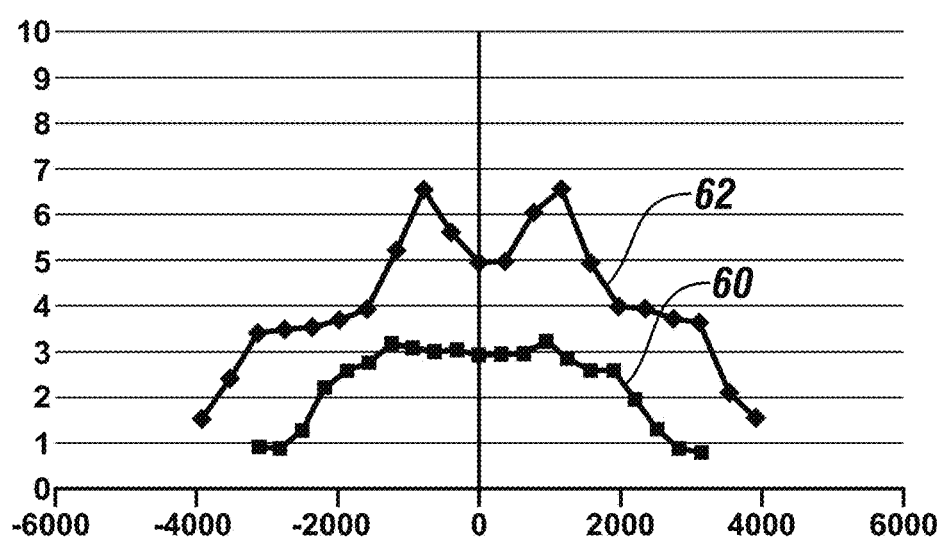
FIG. 4 illustrates the variation of the thickness of an intermetallic layer across a bonding interface of a weld joint and a low carbon steel workpiece under two different practices of resistance spot welding an aluminum workpiece to the low carbon steel workpiece.

As an illustration of the interaction between the molten aluminum weld pool 22 and reaction-slowing elements extracted from the steel workpiece 14 during the spot welding process, a variety of baseline tests were first conducted using a low carbon, low strength steel for the steel workpiece as part of a workpiece stack-up that included an aluminum workpiece and an overlapping adjacent steel workpiece. Some results are shown in FIG. 4, which compares the overall thickness (y-axis), in micrometers, of the Fe—Al intermetallic layer(s) across two weld joints formed during spot welding of a 1.2 mm thick aluminum workpiece comprised of AA6022 aluminum alloy (primary alloying elements are silicon, 0.8-1.5 wt %, and magnesium, 0.45-0.75 wt %) to a steel workpiece comprised of 1.0 mm thick hot dip galvanized low carbon steel. The weld joint dimensions (x-axis) are reported in micrometers and are shown as displacements from a weld centerline indicated as '0'. The two weld joint diameters were developed by passing a constant electrical current of 13 kA but varying the duration of current flow. In one case, a current flow duration of 200 ms formed a weld joint of about 6200 μm in diameter at the bonding surface 26, as shown at curve 60, with an overall Fe—Al intermetallic layer(s) thickness of about 3 μm at the weld joint center. When, however, the current flow duration was 800 ms, a weld joint with a diameter of about 8000 μm was formed, as shown at curve 62, with an overall Fe—Al intermetallic layer(s) thickness that reached as high as about 6.5 μm just outside of the center of the weld joint.

Figure 5:
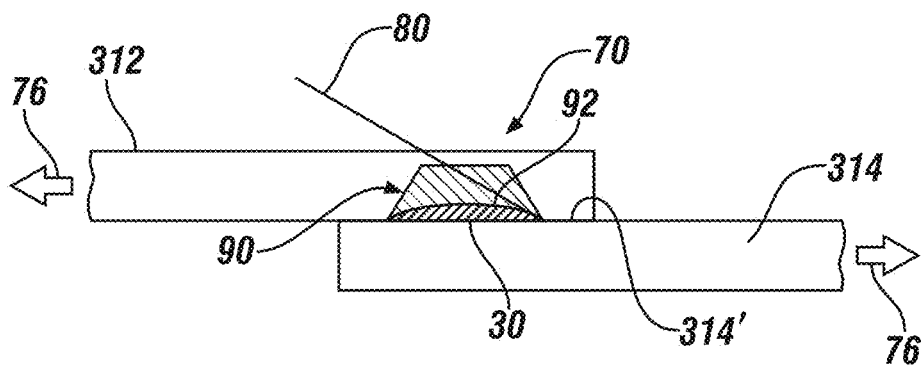
FIG. 5 illustrates a test specimen for evaluating the strength of a weld joint prior to applying a load to the weld joint.
Figure 6:
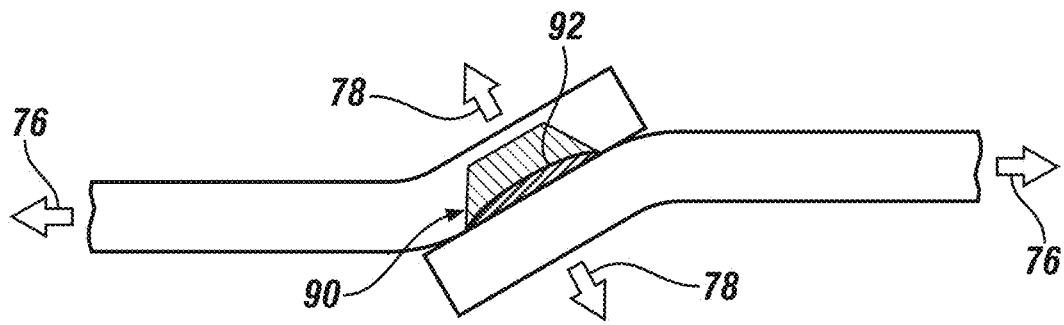
FIG. 6 illustrates a test specimen for evaluating the strength of a weld joint after applying a load to the weld joint.

Peel strength testing was then performed on weld joints formed under the conditions described above in connection with FIG. 4. Referring now to FIGS. 5-6, a demonstration of peel strength testing is shown. Beginning with FIG. 5, a test coupon 70 illustrates in cross-section a weld joint 90 formed between an aluminum workpiece 312 (AA6022 aluminum alloy) and a steel workpiece 314 (hot dip galvanized low carbon steel). The weld joint 90 is contained within the aluminum workpiece 312 and includes one or more Fe—Al intermetallic layer(s), shown as a single layer 92, disposed against the faying surface 314' of the steel workpiece 314. When acted on by a tensile force, indicated by opposing arrows 76, the test coupon 70 undergoes rotation and adopts the configuration shown in FIG. 6. Such a configuration applies a peel force, shown as opposed arrows 78 in FIG. 6 to the weld joint 90 and, particularly, to the perimeter of the weld joint 90. The response of the weld joint 90 to this peel force is sensitive to both the overall thickness of the Fe—Al intermetallic layer(s) 92, particularly at the perimeter of the bonding interface of the weld joint 90 and the faying surface 314' of the steel workpiece 314, and also to the slope 80 of the overall thickness of the Fe—Al intermetallic layer(s) 92 at the perimeter of the weld joint 90. Peel strength testing has shown that, preferably, the overall thickness of the Fe—Al intermetallic layer(s) 92 should be no greater than 3 μm at the perimeter of the weld joint 90 in order to attain consistently strong joints.

Figure 7:
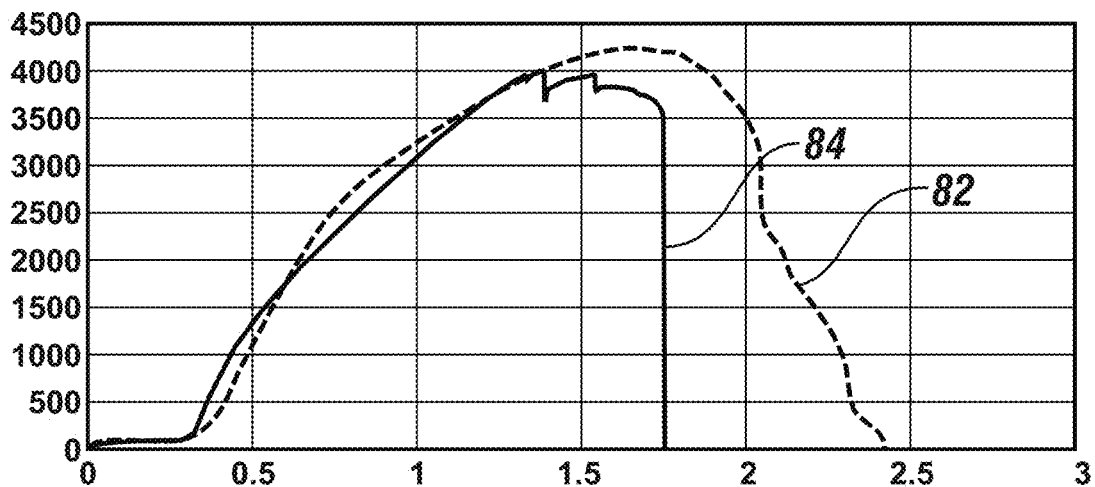
FIG. 7 shows Load-Elongation plots for weld joints made under conditions identical to those used to prepare the weld joints whose intermetallic layer thicknesses across the weld joints are depicted in FIG. 4.

FIG. 7 illustrates load-elongation plots for weld joints formed using the same weld conditions used to develop the overall Fe—Al intermetallic layer(s) thickness plots shown in FIG. 4. In these load-elongation plots, the y-axis indicates the applied load in Newtons (N) and the x-axis is the observed elongation of the weld joint in millimeters. Curve 82 reflects the behavior of the weld joint formed when using a constant current of 13 kA applied for 200 ms and curve 84 reflects the behavior of the weld joint using a constant current of 13 kA applied for 800 ms. In other words, curve 80 is indicative of the load-elongation behavior of a weld joint with an overall Fe—Al intermetallic layer(s) thickness as shown in curve 60 in FIG. 4, while curve 84 is indicative of the load-elongation behavior of a weld joint with an overall Fe—Al intermetallic layer(s) thickness as shown in curve 62 in FIG. 4. While the initial portions of load-extension curves 82, 84 are virtually indistinguishable, the smaller weld joint (in diameter) with thinner Fe—Al intermetallic layer(s) (curve 82) exhibits significantly greater ductility than the larger weld joint (in diameter) with thicker Fe—Al intermetallic layer(s) (curve 84).

Moreover, the energy absorbed by the weld joints whose load-elongation plots are illustrated in FIG. 7 is proportional to the area under their respective load-elongation curve. As such, the extended ductility shown by the weld joint with the thinner Fe—Al intermetallic layer(s) (curve 82) results in a higher energy absorption than the weld joint with the thicker Fe—Al intermetallic layer(s) (curve 84). Specifically, curve 82 exhibits an energy absorption of 5.5 Joules while curve 84 exhibits an energy absorption of 3.7 Joules. Thus, despite the greater weld joint diameter (8000 μm vs. 6200 μm) of the long duration (800 ms) weld joint (curve 84 in FIG. 7 and curve 62 in FIG. 4), the short duration (200 ms) weld joint (curve 82 in FIG. 7 and curve 60 in FIG. 4) absorbs approximately 50% more energy. These differences in weld ductility and energy absorption can be fairly attributed to the overall thickness of the Fe—Al intermetallic layer(s) that form during resistance spot welding and the slope of the intermetallic layer(s) at the perimeter of the weld joint.

For the automotive grade low carbon, low strength steel examined in the testing that produced the results discussed in connection with FIGS. 4-7, the amounts of alloying elements are generally low. Carbon will typically be present in an amount between 0.001 wt % and 0.005 wt % while manganese will typically be present in an amount below 0.5 wt %. Additionally, the amounts of sulfur and phosphorous are typically controlled to be below 0.05 wt % and, preferably, to below 0.025 wt %. Residual elements such as (in alphabetical order), chromium, copper, nickel, lead, molybdenum, and tin, may also be present in limited amounts both individually and collectively. In contrast to low carbon, low strength steel, high strength steels generally have higher concentrations of alloying elements. For example, high-strength-low-alloy (HSLA) steel and dual phase (DP) steel, among other grades of steel, typically contain higher amounts of one or more of the above-noted reaction-slowing elements compared to low carbon, low strength steel. In particular, 340 grade HSLA steel (minimum tensile strength of 410 MPa) may contain up to 0.12 wt % carbon, up to 1.5 wt % manganese, and up to 0.5 wt % silicon, and DP600 steel (minimum tensile strength of 600 MPa) may contain up to 1.5 wt % carbon, up to 2.5 wt % manganese, and up to 0.60 wt % silicon.

Figure 8:
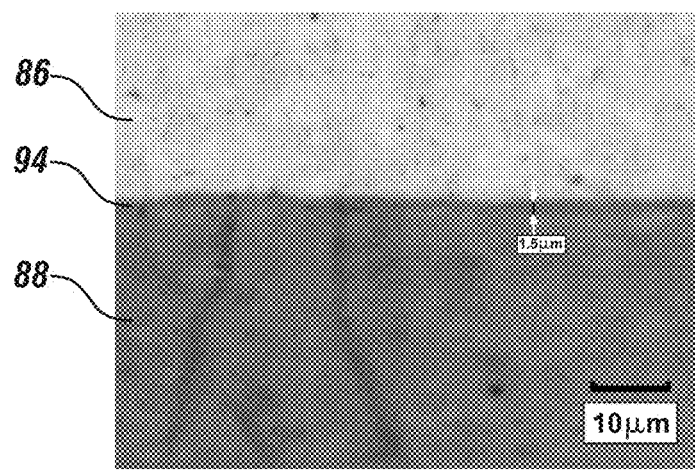
FIG. 8 is an optical photomicrograph, at nominal identical magnification, showing the structure and thickness of the intermetallic layer developed at the bonding interface of the weld joint and the steel workpiece when resistance spot welding an aluminum workpiece (AA6022 aluminum alloy) to a hot dip galvanized low carbon steel workpiece.
Figure 9:
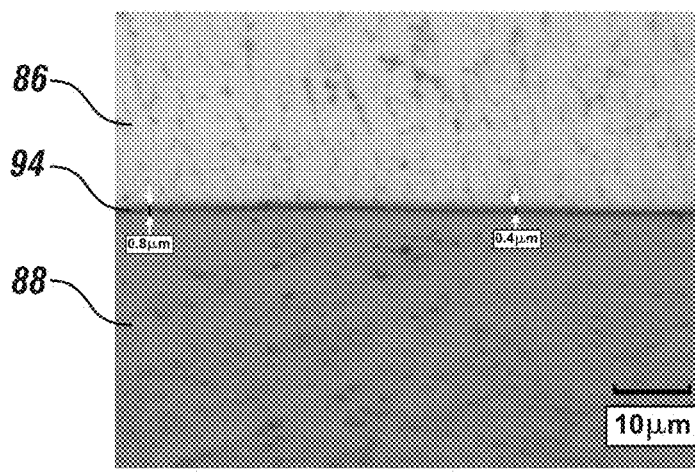
FIG. 9 is an optical photomicrograph, at nominal identical magnification, showing the structure and thickness of the intermetallic layer developed at the bonding interface of the weld joint and the steel workpiece when resistance spot welding an aluminum workpiece (AA 6022 aluminum alloy) to a hot dip galvanized dual phase steel workpiece.

The influence of the higher manganese amounts contained in HSLA and DP steel on the formation and growth of Fe—Al intermetallic compounds, and thus the overall thickness of the Fe—Al intermetallic layer(s), when conducting resistance spot welding on a workpiece stack-up that includes an aluminum workpiece and an overlapping adjacent steel workpiece is shown in representative fashion in the optical photomicrographs of FIGS. 8-9. These photomicrographs illustrate the overall thickness of the Fe—Al intermetallic layer(s) developed at the center of a weld joint between an aluminum workpiece 86 comprised of AA6022 aluminum alloy and a steel workpiece 88 comprised of (1) an ultra-low carbon steel (FIG. 8) with principal alloying elements of 0.002 wt % C, 0.1 wt % Mn, and 0.01 wt % Si and (2) a DP600 high strength steel (FIG. 9) with principal alloying elements of 0.008 wt % C, 1.9 wt % Mn, and 0.01 wt % Si. In both cases, the aluminum workpiece 86 was 1.2 mm thick and the steel workpiece 88 was 1.0 mm thick and hot dip galvanized, and the weld joint formed had a diameter at the bonding interface of the weld joint and the faying surface of the steel workpiece of approximately 8000 μm.

The weld joint microstructures shown in FIGS. 8-9 were produced using a multi-stage welding process which generally followed the practices detailed in U.S. application Ser. No. 14/883,249, filed on Oct. 14, 2015, and entitled "Multi-Stage Resistance Spot Welding Method for Workpiece Stack-Up Having Adjacent Steel and Aluminum Workpieces." Specifically, for the microstructure shown in FIG. 8, a clamping load of 800 lbf was applied to the workpiece stack-up and electrical current of 17 kA was passed through the aluminum and steel workpieces for 125 ms. A 250 ms cooling period was then implemented to allow the weld joint to solidify from the molten weld pool. Once solidified, the weld joint was remelted using thirteen current pulses of 33 kA with intervening 10 ms cooling periods. Finally, after all the remelting stages were performed, a final cooling period of 250 ms was implemented. The microstructure shown in FIG. 9 was produced using a nearly identical process with the exception that the electrical current pulsed employed during remelting of the weld joint were reduced to 32 kA to balance the effect of the more resistive DP steel. It may be noted that this multi-stage spot welding procedure, despite the higher currents applied, produced Fe—Al intermetallic layer(s) 94 having an overall thickness no greater than that represented by curve 60 shown in FIG. 4.

As shown in FIGS. 8-9, and although there is some variation in the overall thickness of the Fe—Al intermetallic layer(s) 94, it is apparent that the thickness of the Fe—Al intermetallic compound layer 94 in FIG. 9 is appreciably reduced, on average, by nearly a factor of two, when spot welding with the steel workpiece 88 in the form of high-manganese content DP600 steel. Without being bound by any particular theory, this difference is believed to arise due the slowness of achieving an equilibrium partitioning of manganese in the steel and the first-formed Fe—Al intermetallic composition. Since both the Fe—Al intermetallic compounds and the steel are solids at the temperature of the molten weld pool, alloy partitioning requires solid state diffusion in both the intermetallic compound and the steel, which is an inherently slow process. Moreover, silicon in the aluminum workpiece (AA6022 aluminum alloy) is thought to have little, if any, influence on the overall thickness of the Fe—Al intermetallic layer(s). For example, an AA6022 alloy was selected as the aluminum workpiece in the experiments related to FIGS. 4, 7, and 8-9. To that end, and again without wishing to be bound by any particular theory, it is believed that the rapid diffusion and mixing that occurs within the aluminum-rich molten weld pool enables ready attainment of an equilibrium partition of any reaction-slowing alloying elements originally contained in the aluminum workpiece—which in the case of AA6xxxx alloys is silicon—between the molten weld pool and the growing Fe—Al intermetallic layer(s).

Figure 10:
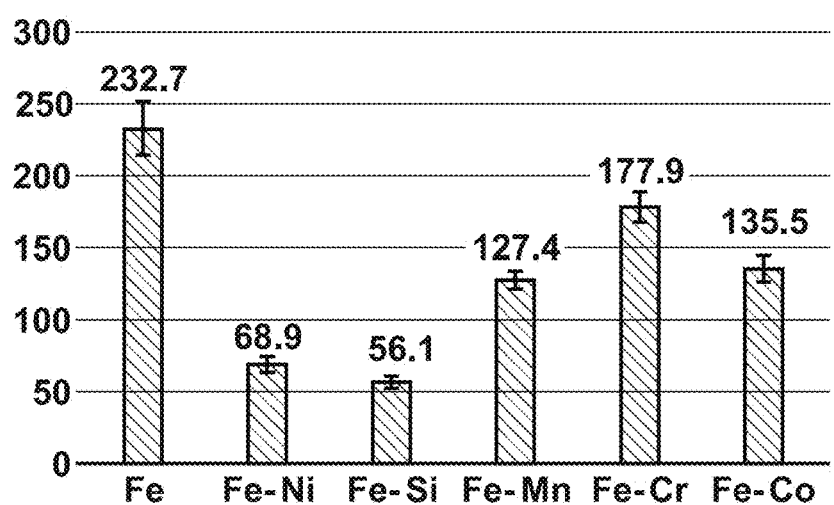
FIG. 10 is a bar graph showing the mean intermetallic layer thickness and the standard deviation in the intermetallic layer thickness developed on a series of iron-based alloys containing 2 wt % of the indicated element after immersion in molten aluminum at a temperature of 760° C. for 600 seconds.

Accordingly, when it is desired that the steel workpiece 14 have reaction-slowing elements dissolved therein as contemplated by this particular embodiment of the disclosed method, HSLA steel and DP steel are good candidates due to their relatively high manganese contents that exceed 0.5 wt % in amount and higher carbon levels that can exceed 0.010 wt % in amount. Of course, as discussed above, other reaction-slowing elements may function similarly and just as effectively as carbon and manganese in suppressing Fe—Al intermetallic compound formation and growth. Indeed, experiments were conducted by immersing steel coupons containing 2 wt % of various alloying elements in molten aluminum at 760° C. for 600 seconds (which is much longer than would typically occur in spot welding applications) to demonstrate the relative effectiveness of different alloying elements. The results are shown FIG. 10, which shows, as a bar graph, the average overall thickness in micrometers (y-axis) and standard deviation (included on each bar) of the Fe—Al intermetallic layer(s) developed on the steel coupons of each alloy. These results, with data from pure iron included for reference, indicate each of chromium, cobalt, manganese, nickel and silicon (listed in increasing order of effectiveness) can suppress formation and growth of Fe—Al intermetallic compounds and, consequently, limit the overall thickness of the Fe—Al intermetallic layer(s). A variety of high strength steels can be selected with, or modified to include, any of the above-noted reaction-slowing elements to carry out this particular embodiment of the disclosed method.

In some practices of the disclose method, however, the use of a steel workpiece that does not include an effective amount of any of the reaction-slowing elements may have to be used within the workpiece stack-up 10. These steel compositions may include a low carbon, low strength steel such as interstitial-free (IF) steel or a low strength bake-hardenable steel. Under such circumstances, the disclosed method may be carried out according to other embodiments that, like the previous embodiment, are able to provide reaction-slowing elements at the faying interface 16 of the aluminum and steel workpieces 12, 14 to inhibit the formation of Fe—Al intermetallic compounds. In these other embodiments, which are described in more detail below, the reaction-slowing elements are present in an interlayer disposed between the aluminum and steel workpieces 12, 14 at the faying interface 16.

Figure 11:
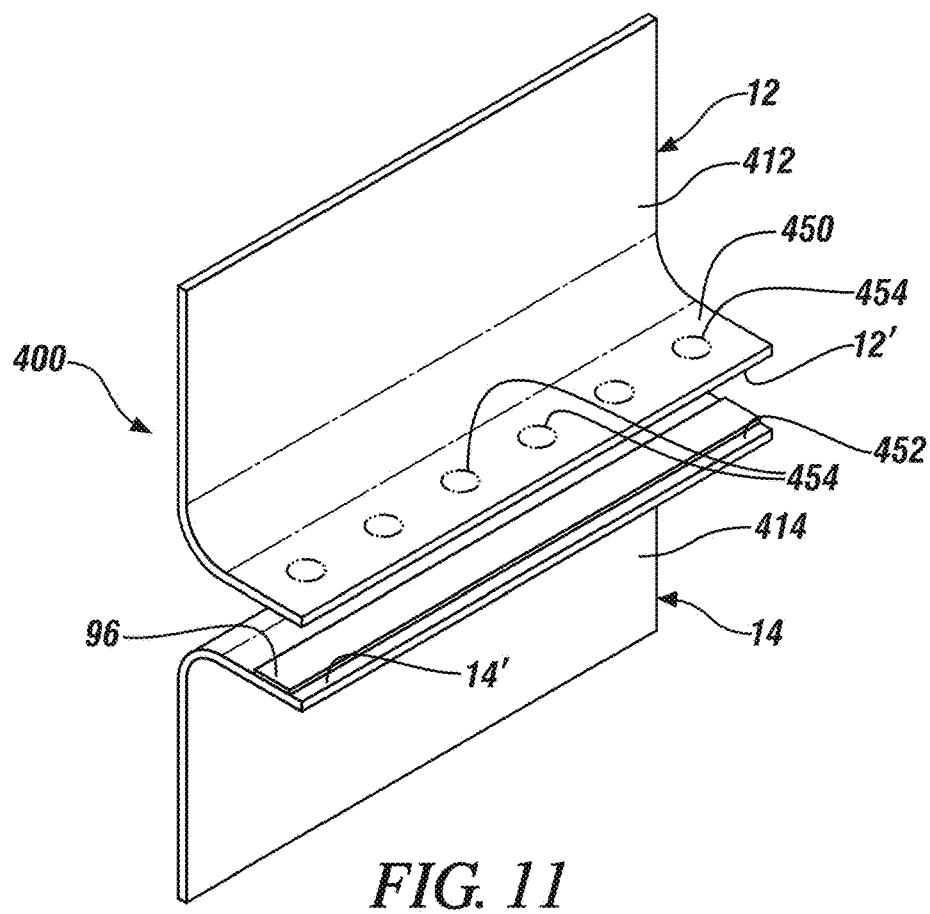
FIG. 11 shows, in perspective view, an exemplary resistance spot weld configuration for joining an aluminum workpiece to a steel workpiece similar to that shown in FIG. 3 although, here, an interlayer that includes the reaction-slowing elements is disposed between the aluminum workpiece and the steel workpiece according to various embodiments of the present disclosure.
Figure 12:
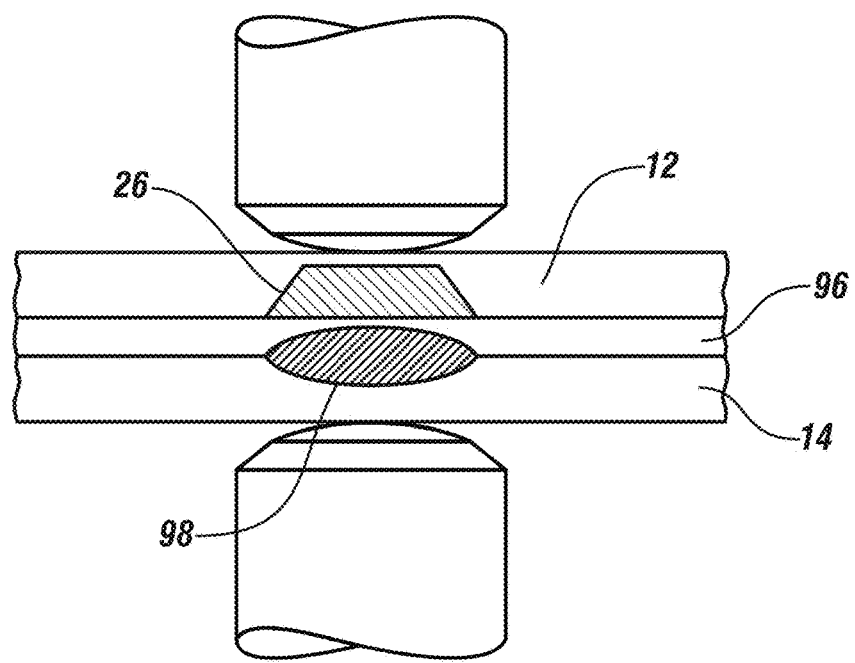
FIG. 12 shows, in cross-section, the idealized structure of a weld joint that weld bonds together the aluminum workpiece and the adjacent interlayer along with a weld nugget that fusion welds together the interlayer and the steel workpiece according to an embodiment of the present disclosure.

FIGS. 11-12 illustrate an embodiment of the disclosed method that may be employed when the workpiece stack-up 400 includes a steel workpiece 14 (shown here in the form of a sheet 414) lacks an effective amount of the reaction-slowing elements. There, as shown, an interlayer 96 in the form of a rigid shim composed of high strength steel or a custom ferrous-based alloy that includes one or more of the reaction-slowing elements (i.e., carbon, copper, silicon, nickel, manganese, cobalt, or chromium) in their requisite amounts may be interposed between and in contact with the faying surface 12' of the aluminum workpiece 12 (also shown here in the form of a sheet 412) and the faying surface 14' of the steel workpieces 14. The shim is a discrete component that can be inserted between the opposed flanges 450, 452 during assembly of the workpiece stack-up 400. Such an approach to spot welding entails creating a weld pool shared by the interlayer 96 and the steel workpiece that, upon solidification, forms a fusion weld nugget between the steel workpiece 14 and the interlayer 96 while, at the same time, the weld joint 24 is formed within the aluminum workpiece 12 such that it weld bonds or brazes together the aluminum workpiece 12 and the interlayer 96, as shown in FIG. 12. While the interlayer 96 shown here in FIG. 11 is in the form of a discrete shim contained within the flanges 450, 452 of the aluminum and steel workpieces 12, 14, it will be appreciated that the interlayer 96 may also extend beyond the overlapping flanges 450, 452 of the aluminum and steel workpieces 12, 14.

The interlayer 96, when formed as a shim, should be weldable to the steel workpiece 14 and, additionally, it should have a high enough melting temperature that the fusion weld nugget is shared between the interlayer 96 and the steel workpiece 14 and that the surface of the interlayer 96 in contact with the faying surface 12' of the aluminum workpiece 12 remains solid (i.e., does not melt) to support bonding with the weld joint 24. To that end, the interlayer 96 may be a carbon-containing, high manganese HSLA or dual phase steel like those described above or any other steel comprising a sufficient composition of reaction-slowing elements, or it may be a single phase (ferrite) iron-rich solid solution alloy comprised of iron and one of the reaction-slowing elements including, for example, an alloy of (1) iron and carbon, (2) iron and copper, (3) iron and silicon, and (4) iron and manganese. These alloys may contain at least 0.010 wt % carbon, at least 0.2 wt % copper, at least 0.030 wt % silicon, and at least 0.5 wt % manganese, respectively. Preferably, for maximum effect, these alloys may contain at least 0.050 wt % carbon, at least 0.2 wt % copper, at least 0.3 wt % silicon, and at least 1.0 wt % manganese, respectively. The concentration of binary alloys containing copper, silicon, and manganese is set by their maximum solubility in ferrite as indicated by their relevant binary phase diagrams. Such solubility limits correspond to between 3 wt % and 4 wt % for manganese, to between 5 wt % and 6 wt % for silicon, and to no more than 0.8 wt % for copper. For a binary alloy of iron and carbon, the maximum carbon content would be slightly greater than the eutectoid composition or about 1.0 wt %. Constraining the composition within the above limits will ensure that the interlayer 96 is a single phase, although higher amounts of the elements, e.g., up to 30 wt % for manganese, for example, may be permitted if the interlayer 96 is employed as a ternary or multiphase alloy. The interlayer 96, moreover, may be galvanized, either by hot dipping or by electrodeposition, if exposure to corrosive environments is anticipated.

As noted above, the resistance spot welding process of this particular embodiment is aided by the formation of a fusion weld nugget 98 comprised of steel between the steel workpiece 14 and the interlayer 96, as shown in FIG. 12. This weld nugget 98 acts to concentrate heat within the steel workpiece 14 and the interlayer 96 during current flow to produce radial temperature gradients that improve the solidification structure of the weld joint 24 within the aluminum workpiece 12. In addition, the weld nugget 98 tends to disturb the faying interface 16 of the aluminum and steel workpieces 12, 14 by pushing the steel workpiece 12 into the aluminum workpiece 14. Such deformation of the steel workpiece 14 can help disrupts or break up residual oxide film defects entrapped within the growing molten weld pool 22 while also serving as a crack deflector in the final weld joint 24. By using the interlayer 96 in the form of a shim, as described, it is possible to indirectly secure the aluminum workpiece 12 to the steel workpiece 14 without forming an excessively thick Fe—Al intermetallic layer at the bonding interface of the weld joint 24 and the adjacent surface of the interlayer 96 for the reasons explained above. Indeed, as shown in FIG. 12, the fusion weld nugget 98 fuses the steel workpiece 14 to the shim and weld joint 24 weld bonds or brazes the shim to the aluminum workpiece 12.

In a related yet alternative embodiment to that shown in FIGS. 11-12, the interlayer 96 may be in the form of flexible foil instead of a rigid shim. Since it is challenging—but not necessarily unachievable—to obtain high strength steel in thin foil gauges, the more-practical use of high strength steel as the interlayer 96 is in the form a shim that could potentially add significant mass to workpiece stack-up 400 being joined. A thinner interlayer 96 in the form of a custom ferrous-based alloy foil may thus be an attractive option in some instances. The custom ferrous-based alloy that may be employed as the foil may be any of the alloys described above with regards to the shim. The custom ferrous-based alloy may be as a single phase (ferrite) iron-rich solid solution alloy comprised of iron and one of the reaction-slowing elements including, for example, an alloy of (1) iron and carbon, (2) iron and copper, (3) iron and silicon, and (4) iron and manganese. These alloys may contain at least 0.010 wt % carbon, at least 0.2 wt % copper, at least 0.030 wt % silicon, and at least 0.5 wt % manganese, respectively. Preferably, for maximum effect, these alloys may contain at least 0.050 wt % carbon, at least 0.2 wt % copper, at least 0.3 wt % silicon, and at least 1.0 wt % manganese, respectively. The upper concentration of binary alloys containing copper, silicon, and manganese is set by their maximum solubility in ferrite as indicated by their relevant binary phase diagrams, and the maximum carbon content of a binary alloy of iron and carbon would be slightly greater than the eutectoid composition, as previously described. The interlayer 96 in the form of a flexible foil may be fabricated by electrodeposition or cold rolling and, like the shim, may be inserted between the opposed flanges 450, 452 during assembly of the workpiece stack-up 400.

When the interlayer 96 is in the form of a flexible foil, the same general approach to spot welding applies in that the fusion weld nugget is formed between the steel workpiece 14 and the interlayer 96 while, at the same time, the weld joint 24 is formed within the aluminum workpiece 12 to weld bonds or brazes together the aluminum workpiece 12 and the interlayer 96. With this in mind, the thickness of the interlayer 96 when formed as a foil and the weld conditions must be selected to fuse the foil to the steel workpiece 14 by way of the fusion weld nugget 98 without completely melting the foil; that is, the fusion weld nugget is to be shared between the interlayer 96 and the steel workpiece 14 and the surface of the interlayer 96 in contact with the faying surface 12' of the aluminum workpiece 12 is to remain solid (i.e., does not melt) to support bonding with the weld joint 24. By using the interlayer 96 in the form of a foil, as described, it is possible to indirectly secure the aluminum workpiece 12 to the steel workpiece 14 without forming an excessively thick Fe—Al intermetallic layer at the bonding interface of the weld joint 24 and the adjacent surface of the interlayer 96 for the reasons explained above.

In still another related yet alternative embodiment to that shown in FIGS. 11-12, the interlayer 96 may be a deposited layer adhered directly to the faying surface 14' of the steel workpiece 14. Thermal processes such as arc welding, cold metal transfer, plasma or flame deposition, or cold spraying are a few possible techniques for depositing the interlayer 96 onto the steel workpiece 414. Accordingly, in this embodiment, the interlayer 96 may be a custom ferrous-based alloy that is metallurgically bonded to the faying surface 14' of the steel workpiece and which includes an effective amount of the one or more reaction-slowing elements. A range of ferrous-based alloys may be considered including those single phase (ferrite) iron-rich solid solution alloy described above. But, since the deposited layer need not be welded to the underlying steel workpiece 14 during the spot welding process like in the previous embodiments, ferrous-based alloys with a greater concentration of the reaction-slowing elements may also be considered, particularly if multi-phase compositions are acceptable. Of course, in some implementations of this embodiment, the interlayer in the form of a deposited layer may be selected to remain solid at the welding temperature.

Figure 13:
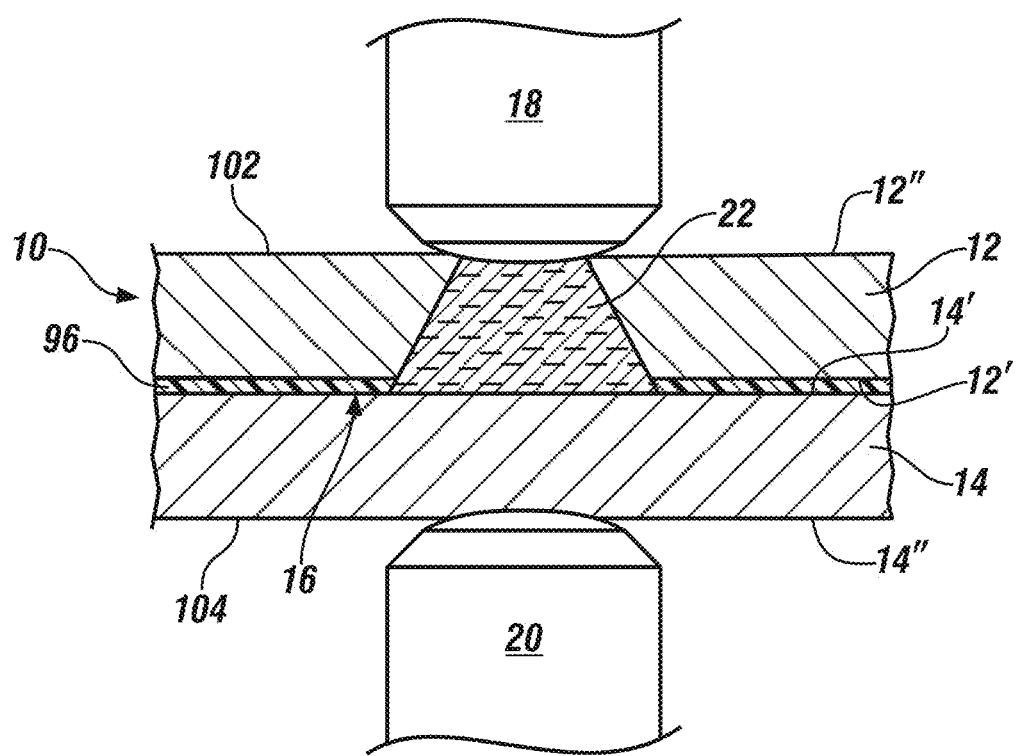
FIG. 13 shows, in cross-section, an exemplary resistance spot weld configuration for joining an aluminum workpiece to a steel workpiece although, here, an interlayer in the form of an interadjacent organic material layer disposed between the aluminum workpiece and the steel workpiece according to an embodiment of the present disclosure.
Figure 14:
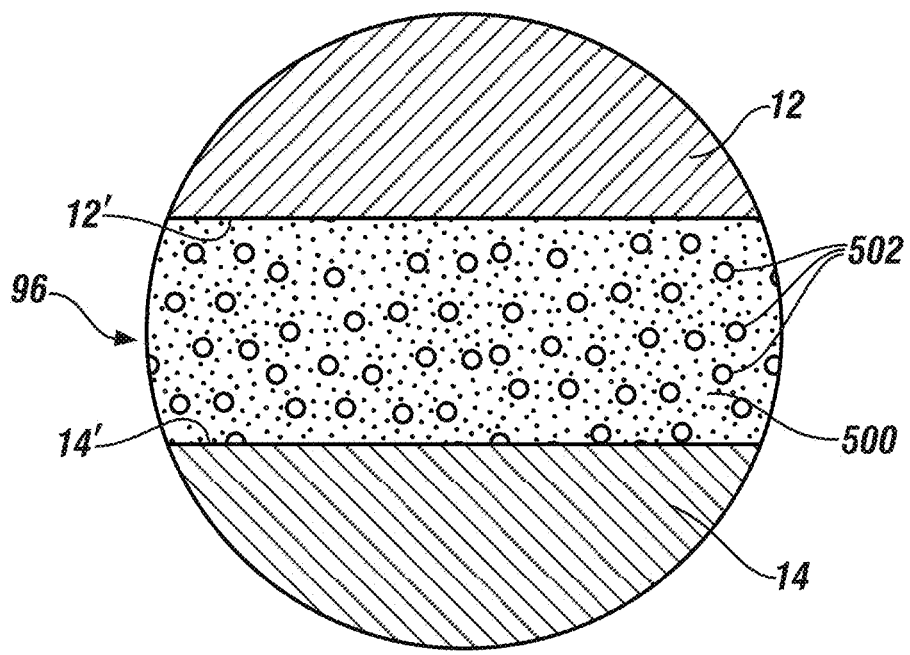
FIG. 14 is a magnified view of a portion of the interadjacent organic material layer depicted in FIG. 13.

In still another related yet alternative embodiment to that shown in FIGS. 11-12, the interlayer 96 may be an interadjacent organic material layer that includes an organic material matrix 500 and particles 502 of the one or more reaction-slowing elements, as shown in FIGS. 13-14. The interadjacent organic material that is present as a layer extending between and along the faying surfaces 12', 14' of the aluminum and steel workpieces 12, 14 may be a heat-curable weld-through adhesive layer that includes a structural heat-curable thermosetting polymer matrix (the organic material 500) and particles 502 containing one or more of the reaction-slowing elements (e.g., particles of carbon, copper, silicon, nickel, manganese, cobalt, and/or chromium) dispersed throughout and embedded within the polymer matrix, as shown in FIG. 14. The heat-curable thermosetting polymer matrix may be any curable structural adhesive including, for example, as a heat-curable epoxy or a heat-curable polyurethane. Some specific examples of heat-curable structural adhesives that may be used as the polymer matrix include DOW Betamate 1486, Henkel Terokal 5089, and Uniseal 2343, all of which are commercially available. The heat-curable weld-through adhesive, when applied as the interlayer 96, preferably has a thickness that ranges from 0.1 mm to 2.0 mm or, more narrowly, from 0.2 mm to 1.0 mm. In other implementations, the interadjacent organic material layer may comprise a heat-curable sealer having a dispersal of particles containing one or more of the reaction-slowing elements.

The particles 502 may be composed of the reaction-slowing elements in unalloyed form or they may be alloys that include the reaction-slowing elements such binary alloys of Fe—C, Fe—Si, Fe—Ni, Fe—Mn, Fe—Cr, Fe—Cu, and/or Fe—Co, ternary alloys such as Fe—Mn—C, Fe—Si—Mn and/or Fe—Cr—Mn, as well as quaternary alloys. The particles 502 may be homogeneous in terms of their composition or they may be a mixture of more than one kind of particles. And while the proportion of the particles 502 dispersed within the organic material matrix 500 (such as the heat-curable thermosetting polymer matrix of a heat-curable weld-through matrix) may vary, a preferred embodiment includes anywhere from 1 vol % to 50 vol %, or more narrowly from 5 vol % to 20 vol %, of the total volume of particles 502 contained within the the organic material matrix 500. Moreover, this quantity of the particles 502 combined with some reduced level of fumed silica (commonly used as filler particles in weld-through adhesives) is able to bestow desirable thixotropic properties to the heat-curable weld-through adhesive layer while also thermodynamically impede the growth of the Fe—Al intermetallic layer(s) 30 within the weld joint 24 as described above. What is more, the particles 502 do not interact with and stabilize residuals of the refractory oxide layer in the way that fumed silica particles do. This inertness to residuals of the refractory oxide layer avoids the creation of a more persistent and tenacious composite residue layer during current flow, thus improving the ability of the molten weld pool 22 to wet the steel workpiece 14.

Referring back to FIG. 13, the interlayer 96 in the form of an interadjacent organic material layer can suppress Fe—Al intermetallic compound formation and growth by making the reaction-slowing elements available at the faying interface 16 for exposure to the molten weld pool 22 in much the same way as before. In particular, under spot welding conditions and using the heat-curable weld-through adhesive as an example of the organic material layer, the heat-curable weld-through adhesive is first laterally displaced under the high compressive force provided by the welding electrodes 18, 20. Any remaining portion of the thermosetting adhesive polymer matrix is thermally decomposed within the weld location during current flow. The thermal decomposition of the polymer matrix tends to leave behind some of the particles 502 near the faying surface 14' of the steel workpiece 14 as well as other residuals of the adhesive layer including carbon ash. Outside of the weld location, the heat-curable weld-through adhesive layer remains generally undisturbed and is able to provide its adherent bonding function outside of and around the resultant weld joint when cured during subsequent operations.

When the molten weld pool 22 is created within the aluminum workpiece 12, the particles 502 counter the formation and growth of Fe—Al intermetallic compounds because of partitioning that occurs between the elements of carbon, copper, silicon, nickel, manganese, cobalt, and/or chromium and the Fe—Al intermetallic compounds that form. The molten weld pool 22 eventually solidifies into the weld joint 24 upon termination of current flow so that, at least in this embodiment, the bonding surface 26 of the resultant joint 24 weld bond or brazes the aluminum workpiece 12 to steel workpiece 14. Owing to the particles 502 contained within the organic material matrix 500 of the interadjacent organic material layer, the Fe—Al intermetallic layer(s) 30 located contiguous with the interface of the bonding surface 26 of the weld joint 24 and the faying surface 14' of the steel workpiece 14 is typically less than 3 µm thick and, in many instances, is between 0.5 µm and 1.5 µm thick across the entire bonding surface 26. By contrast, resistance spot welding operations that employ conventional adhesives with a fused silica particulate phase tend to produce weld joints that have a Fe—Al intermetallic layer up to 7 µm thick or even greater locally depending on a variety of factors including the composition of the steel workpiece 14.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of resistance spot welding a workpiece stack-up that includes an aluminum workpiece and an overlapping steel workpiece so as to minimize the thickness of an intermetallic layer comprising Fe—Al intermetallic compounds, the method comprising:
   providing a workpiece stack-up that has an accessible first side and an opposed accessible second side, the workpiece stack-up comprising an aluminum workpiece, an overlapping steel workpiece, and a ferrous-based interlayer disposed between a faying surface of the aluminum workpiece and a faying surface of the steel workpiece, the ferrous-based interlayer comprising one or more reaction-slowing elements that comprise at least one of carbon, copper, silicon, nickel, manganese, cobalt, or chromium;
   pressing a weld face of a first welding electrode against the first side of the workpiece stack-up and pressing a weld face of a second welding electrode against the second side of the workpiece stack-up in facial alignment with the weld face of the first welding electrode;
   passing an electrical current between the weld faces of the first and second welding electrodes and through the workpiece stack-up to melt the aluminum workpiece and create a molten weld pool contained within the aluminum workpiece that contacts the ferrous-based interlayer but does not melt the ferrous-based interlayer, the one or more reaction-slowing elements suppressing the formation and growth of Fe—Al intermetallic compounds; and
   terminating passage of the electrical current to thereby allow the molten weld pool to solidify into a weld joint that includes an aluminum weld nugget within the aluminum workpiece and one or more Fe—Al intermetallic layers at a bonding surface of the weld joint with the ferrous-based interlayer, the ferrous-based interlayer also being fused or bonded to the steel workpiece after passage of the electrical current is terminated.

2. The method set forth in claim 1, wherein the ferrous-based interlayer is a rigid shim, the rigid shim being composed of high strength steel having a tensile strength of 300 MPa or greater and in which the one or more reaction-slowing elements are alloying elements of the high strength steel, or the rigid shim being composed of a custom ferrous-based alloy that includes the one or more reaction-slowing elements dissolved in a solid solution.

3. The method set forth in claim 2, wherein the ferrous-based interlayer is a rigid shim composed of a custom ferrous-based alloy that includes the one or more reaction-slowing elements dissolved in a solid solution, the custom ferrous-based alloy being an alloy of (1) iron and carbon with at least 0.010 wt % carbon, (2) iron and copper with at least 0.2 wt % copper, (3) iron and silicon with at least 0.030 wt % silicon, or (4) iron and manganese with at least 0.5 wt % manganese.

4. The method set forth in claim 1, wherein the ferrous-based interlayer is a flexible foil composed of a custom ferrous-based alloy that includes the one or more reaction-slowing elements dissolved in a solid solution.

5. The method set forth in claim 4, wherein the custom ferrous-based alloy is an alloy of (1) iron and carbon with at least 0.010 wt % carbon, (2) iron and copper with at least 0.2 wt % copper, (3) iron and silicon with at least 0.030 wt % silicon, or (4) iron and manganese with at least 0.5 wt % manganese.

6. The method set forth in claim 1, wherein the ferrous-based interlayer is a deposited layer adhered directly to and metallurgically bonded with the faying surface of the steel workpiece.

7. The method set forth in claim 6, wherein the deposited layer is a single phase iron-rich solid solution alloy of (1) iron and carbon with at least 0.010 wt % carbon, (2) iron and copper with at least 0.2 wt % copper, (3) iron and silicon with at least 0.030 wt % silicon, or (4) iron and manganese with at least 0.5 wt % manganese.

8. A method of resistance spot welding a workpiece stack-up that includes an aluminum workpiece and an overlapping steel workpiece so as to minimize the thickness of an intermetallic layer comprising Fe—Al intermetallic compounds, the method comprising:
   providing a workpiece stack-up that has an accessible first side and an opposed accessible second side, the workpiece stack-up comprising an aluminum workpiece, an overlapping steel workpiece, and an interlayer disposed between a faying surface of the aluminum workpiece and a faying surface of the steel workpiece, the interlayer being selected from the group consisting of (i) a ferrous-based rigid shim comprising iron and one or more reaction-slowing elements, (ii) a ferrous-based flexible foil comprising iron and one or more reaction-slowing elements, (iii) a ferrous-based deposited layer adhered directly to and metallurgically bonded with the faying surface of the steel workpiece and comprising iron and one or more reaction-slowing elements, and (iv) an interadjacent organic material layer that includes an organic material matrix and particles containing one or more reaction-slowing elements, wherein the reaction-slowing elements of the interlayer comprise at least one of carbon, copper, silicon, nickel, manganese, cobalt, or chromium;
   pressing a weld face of a first welding electrode against the first side of the workpiece stack-up and pressing a weld face of a second welding electrode against the second side of the workpiece stack-up in facial alignment with the weld face of the first welding electrode;
   passing an electrical current between the weld faces of the first and second welding electrodes and through the workpiece stack-up to melt the aluminum workpiece and create a molten weld pool contained within the aluminum workpiece, the one or more reaction-slowing elements suppressing the formation and growth of Fe—Al intermetallic compounds; and
   terminating passage of the electrical current to thereby allow the molten weld pool to solidify into a weld joint that includes an aluminum weld nugget within the aluminum workpiece and one or more Fe—Al intermetallic layers at a bonding surface of the weld joint.

9. The method set forth in claim 8, wherein the interlayer is a ferrous-based deposited layer adhered directly to and metallurgically bonded with the faying surface of the steel workpiece.

10. The method set forth in claim 9, wherein the ferrous-based deposited layer is a single phase iron-rich solid solution alloy of (1) iron and carbon with at least 0.010 wt % carbon, (2) iron and copper with at least 0.2 wt % copper, (3) iron and silicon with at least 0.030 wt % silicon, or (4) iron and manganese with at least 0.5 wt % manganese.

11. The method set forth in claim 9, wherein the molten weld pool created within the aluminum workpiece contacts the ferrous-based deposited layer, but does not melt the ferrous-based interlayer, and wherein the weld joint is bonded to the ferrous-based deposited layer after passage of the electrical current is terminated.

\* \* \* \* \*